United States Patent
Hsue et al.

(10) Patent No.: US 7,305,458 B2
(45) Date of Patent: Dec. 4, 2007

(54) SYSTEM AND METHOD FOR AUTO-CONFIGURING STACKABLE NETWORK DEVICES

(75) Inventors: Hong-June Hsue, Hsinchu (TW); Yun-Pin Cheng, Hsinchu (JP); Ran-Yih Wang, Taipei (TW)

(73) Assignee: Accton Technology Corporation, Hsinchu (TW)

( * ) Notice: Subject to any disclaimer, the term of this patent is extended or adjusted under 35 U.S.C. 154(b) by 886 days.

(21) Appl. No.: 10/421,984

(22) Filed: Apr. 22, 2003

(65) Prior Publication Data

US 2005/0021684 A1    Jan. 27, 2005

(51) Int. Cl.
| | |
|---|---|
| G06F 15/177 | (2006.01) |
| G06F 15/16 | (2006.01) |
| G06F 9/24 | (2006.01) |
| H04L 12/28 | (2006.01) |
| G06F 15/173 | (2006.01) |
| G06F 9/00 | (2006.01) |
| G06F 1/24 | (2006.01) |
| H04L 12/56 | (2006.01) |

(52) U.S. Cl. ............... 709/220; 709/221; 709/223; 709/244; 709/249; 713/1; 713/100; 370/254; 370/255; 370/399; 370/395.53; 370/395.71; 370/400; 370/409

(58) Field of Classification Search ............... 709/208, 709/209, 220–224, 239, 244, 245, 249; 713/1, 713/2, 100; 370/254, 255, 389, 396–399, 370/395.3–395.31, 395.53, 395.7–395.72, 370/400, 409
See application file for complete search history.

(56) References Cited

U.S. PATENT DOCUMENTS

| | | | | |
|---|---|---|---|---|
| 5,247,683 A | * | 9/1993 | Holmes et al. | 709/221 |
| 5,548,726 A | * | 8/1996 | Pettus | 709/221 |
| 5,633,858 A | * | 5/1997 | Chang et al. | 370/255 |
| 6,092,214 A | * | 7/2000 | Quoc et al. | 714/4 |
| 6,101,169 A | * | 8/2000 | Fahey | 370/246 |
| 6,115,758 A | * | 9/2000 | Chen | 710/36 |
| 6,118,793 A | * | 9/2000 | Chen | 370/470 |
| 6,175,868 B1 | * | 1/2001 | Lavian et al. | 709/223 |
| 6,243,756 B1 | * | 6/2001 | Whitmire et al. | 709/232 |
| 6,459,700 B1 | * | 10/2002 | Hoang | 370/401 |
| 6,480,488 B1 | * | 11/2002 | Huang | 370/389 |

(Continued)

FOREIGN PATENT DOCUMENTS

TW    490956 A  *  6/2002

OTHER PUBLICATIONS

Magnusson, Peter S. et al. "SIMICS: A Full System Simulation Platform," Computer, vol. 35, Issue 2, Feb. 2002, pp. 50-58.*

(Continued)

*Primary Examiner*—Melvin H. Pollack
(74) *Attorney, Agent, or Firm*—Knobbe Martens Olson & Bear LLP

(57) ABSTRACT

A system and a method for auto-configuring stackable network devices are disclosed for automatically configuring a plurality of stackable network devices. The system for auto-configuring stackable network devices comprises: a configuration file, a command line interface (CLI) component, a switch controller and a topology manger. The method for auto-configuring stackable network devices utilizes the feature that the network device has a unique medium access control (MAC) address, to automatically performing the system configuration.

12 Claims, 5 Drawing Sheets

U.S. PATENT DOCUMENTS

| | | | |
|---|---|---|---|
| 6,657,981 B1* | 12/2003 | Lee et al. | 370/331 |
| 6,779,039 B1* | 8/2004 | Bommareddy et al. | 709/238 |
| 6,873,602 B1* | 3/2005 | Ambe | 370/254 |
| 6,907,469 B1* | 6/2005 | Gallo et al. | 709/238 |
| 6,934,260 B1* | 8/2005 | Kanuri | 370/255 |
| 6,947,384 B2* | 9/2005 | Bare | 370/235 |
| 6,990,101 B1* | 1/2006 | Chow et al. | 370/392 |
| 7,093,027 B1* | 8/2006 | Shabtay et al. | 709/239 |
| 7,099,285 B1* | 8/2006 | Kanuri et al. | 370/254 |
| 7,099,325 B1* | 8/2006 | Kaniz et al. | 370/392 |
| 7,123,615 B2* | 10/2006 | Weyman et al. | 370/389 |
| 7,145,864 B2* | 12/2006 | Lee et al. | 370/216 |
| 2003/0189905 A1* | 10/2003 | Lee | 370/254 |
| 2004/0042416 A1* | 3/2004 | Ngo et al. | 370/254 |
| 2004/0078457 A1* | 4/2004 | Tindal | 709/223 |

OTHER PUBLICATIONS

Beser, B. and Duffy, P. "Dynamic Host Configuration Protocol (DHCP) Option for CableLabs Client Configuration," RFC 3495, Mar. 2003, pp. 1-13.*

McCloghrie, K. and Hanson, G. "The Inverted Stack Table Extension to the Interfaces Group MIB," RFC 2864, Jun. 2000, pp. 1-11.*

Davidson, Brian D. and Hirsh, Haym. "Toward an Adaptive Command Line Interface," Advances in Human Factors/Ergonomics, 1997, pp. 505-508.*

* cited by examiner

SYSTEM AND METHOD FOR AUTO-CONFIGURING STACKABLE NETWORK DEVICES

FIELD OF THE INVENTION

The present invention relates to a system and a method for auto-configuring stackable network devices, and more particularly, to the system and method used for automatically configuring stackable network devices by using medium access (MAC) addresses of the stackable network devices.

BACKGROUND OF THE INVENTION

With the popularity of personal computers and the prosperous development of Internet, information can be exchanged all over the world, and there is a trend of more and more information flowing through networks. Hence, the past systems composed of several computers or devices gathered at a certain place have fallen short of meeting the communication demands. Currently, many systems are no longer formed purely by gathering several computers together, but are composed of the computers or devices distributed on various sites via networking, thereby providing more varieties of service to users, wherein the computers or devices can be any network-related elements, such as workstations, servers, databases, routers and backup devices, etc.

With the rapid growth of network applications, more and more network devices having strong processing capability and high reliability are needed to provide stable support and operation. Since a stackable network device has the features of high reliability, high efficiency and connection flexibility, the stackable network device such as a stackable switch, a stackable hub, a stackable switching hub or a stackable switching router, etc., has been widely utilized to build various networks for conveniently making the future expansion of network or the adjustment of network topology.

Referring to FIG. 1 and FIG. 2, FIG. 1 is schematic diagram showing the simplified structure of a conventional local area network (LAN), and FIG. 2 is a schematic diagram showing the simplified structure of a conventional configuration file, wherein a LAN 10 is composed of a stackable network module 20 connecting to a plurality of computers, and the stackable network module 20 is formed by stacking and connecting three stackable network devices 40, 50 and 60 (such as switches), wherein the stackable network device 40 is a master stackable network device used for activating the stackable network module 20. The stackable network devices 40, 50 and 60 are connected respectively to a plurality of computers 34, 35 and 36. The operating system of the stackable network module 20 is a command line interface (CLI) component, wherein the CLI component can allow users to enter system configuration commands line by line, or to configure the system by executing a configuration file 80 in which the system configuration commands and initialization data are written beforehand.

The configuration file 80 is stored in the stackable network device 40 (master stackable network device), and such as shown in FIG. 2, the initialization data 44, 54 and 64 previously stored for the stackable network devices 40, 50 and 60 are recorded in the configuration file 80, wherein those initialization data 44, 54 and 64 comprise respectively the allocation information of the stackable network devices 40, 50 and 60 and the computers 34, 35 and 36 connected thereto, such as the information of port location and connecting elements, etc. of the stackable network devices 40, 50 and 60. When the stackable network module 20 is activated, the CLI component will load the initialization data sequentially from the top to the bottom in the configuration file 80, i.e. first loading the initialization data 44 (belonging to the stackable network device 40); then loading the initialization data 54 (belonging to the stackable network device 50); and thereafter loading the initialization data 64 (belonging to the stackable network device 60), thereby rapidly and correctly setting each of the elements of the stackable network module 20 to the states previously saved so as to complete the connection between the stackable network module 20 and each of the computers, thus enabling the LAN 10 to work smoothly.

Although the existing stackable network devices have been implemented with multiple user-friendly designs and user interfaces, yet the CLI component loads the initialization data by following the sequence from the top to the bottom in the configuration file. Therefore, if the logic stacking sequence of stacking the stackable network devices 40, 50 and 60 in the stackable network module 20 is the same as the arrangement sequence of recording the initialization data 44, 54 and 64 in the configuration file 80, then the CLI component can set correctly the initialization data 44 to the stackable network device 40; the initialization data 54 to the stackable network device 50; and the initialization data 64 to the stackable network device 60. Otherwise, if the logic stacking sequence of the stackable network devices 40, 50 and 60 in the stackable network module 20 is changed or at least one of the stackable network devices 40, 50 and 60 is withdrawn, the initialization data will be set to the stackable network devices incorrectly. Hence, under the aforementioned circumstances, users have to adjust the setting of each of the stackable network devices manually, so as to prevent the LAN 10 from occurring errors.

For example, in the configuration file 80, assume that the logic sequence number of the stackable network device 50 is #2, and the logic sequence number of the stackable network device 60 is #3. When the logic sequence number of the stackable network device 50 and the logic sequence number of the stackable network device 60 are swapped, users need to configure the initialization data 54 of the stackable network device 50 to the original logic sequence number (i.e. #3) of the stackable network device 60, and the initialization data 64 of the stackable network device 60 to the original logic sequence number (i.e. #2) of the stackable network device 50; or the users may, in the configuration file 80, move the initialization data 54 of the stackable network device 50 to the location at which the initialization data 64 of the stackable network device 60 is originally recorded, and the initialization data 64 of the stackable network device 60 to the location at which the initialization data 54 of the stackable network device 50 is originally recorded, thereby enabling the stackable network devices 50 and 60 to keep on working correctly.

However, the aforementioned steps of configuring the system takes a lot of time and efforts, thus prolonging the down time of the LAN and causing a lot of inconvenience to the clients. On the other hand, since the configuration file 80 is quite lengthy and complicated, errors frequently occur while the data contained therein is manually modified, further resulting in loss of manpower and material.

SUMMARY OF THE INVENTION

It is the principal objective of the present invention to provide a system and a method for auto-configuring stackable network devices, thereby allowing users to automatically configuring a plurality of stackable network devices via a step of system configuration or re-configuration such as system initialization or re-stacking while the stackable network devices having a CLI component alters their logic stacking sequence.

In accordance with the aforementioned objective of the present invention, the present invention provides a system for auto-configuring stackable network devices, thereby automatically configuring a plurality of stackable network devices, wherein each of the stackable network devices has a MAC address.

According to a preferred embodiment of the present invention, the system for auto-configuring stackable network devices comprises: a configuration file having an initialization data previously stored for each of the stackable network devices, the configuration file having a MAC address table for pointing out a correlation between the MAC address and the location at which the initialization data is recorded, the MAC address being arranged and correspondent to a first logic stacking sequence in first allocation information; a topology manager for obtaining second allocation information, the MAC address being currently arranged and correspondent to a second logic stacking sequence in second allocation information; a switch controller for generating an associative allocation information by comparing and analyzing the MAC address correspondent to the second logic stacking sequence in the second allocation information to the MAC address correspondent to the first logic stacking sequence in the first allocation information; and a CLI component for configuring each of the stackable network devices by respectively reading the initialization data of the configuration file from each of said stackable network devices in accordance with the associative allocation information.

Further, in accordance with the aforementioned objective of the present invention, the present invention provides a method for auto-configuring stackable network devices, thereby automatically configuring a plurality of stackable network devices, wherein each of the stackable network devices has a MAC address.

According to a preferred embodiment of the present invention, the method for auto-configuring stackable network devices comprises: providing a configuration file having an initialization data previously stored for each of the stackable network devices is recorded, the configuration file having a MAC address table pointing out a correlation between the MAC address and the location at which the initialization data is recorded, the MAC address being arranged and correspondent to a first logic stacking sequence in first allocation information; obtaining the first allocation information; obtaining second allocation information, the MAC address being arranged and correspondent to a second logic stacking sequence in the second allocation information; performing a step for generating an associative allocation information by comparing and analyzing said MAC address correspondent to the second logic stacking sequence in the second allocation information to the MAC address correspondent to the first logic stacking sequence in the first allocation information; and performing a re-configuration step for configuring each of the stackable network devices by respectively reading the initialization data of the configuration file in accordance with the associative allocation information.

Hence, with the application of the present invention, when a plurality of stackable network devices having a CLI component alters their logic stacking sequence, users can automatically configure the stackable network devices simply via a step of system initialization or re-stacking, thereby enhancing the convenience of using the stackable network devices and saving a lot of manpower and material, thus further greatly reducing the down time of network.

BRIEF DESCRIPTIONS OF THE DRAWINGS

The foregoing aspects and many of the attendant advantages of this invention will become more readily appreciated as the same becomes better understood by reference to the following detailed description, when taken in conjunction with the accompanying drawings, wherein.

Figure 5:
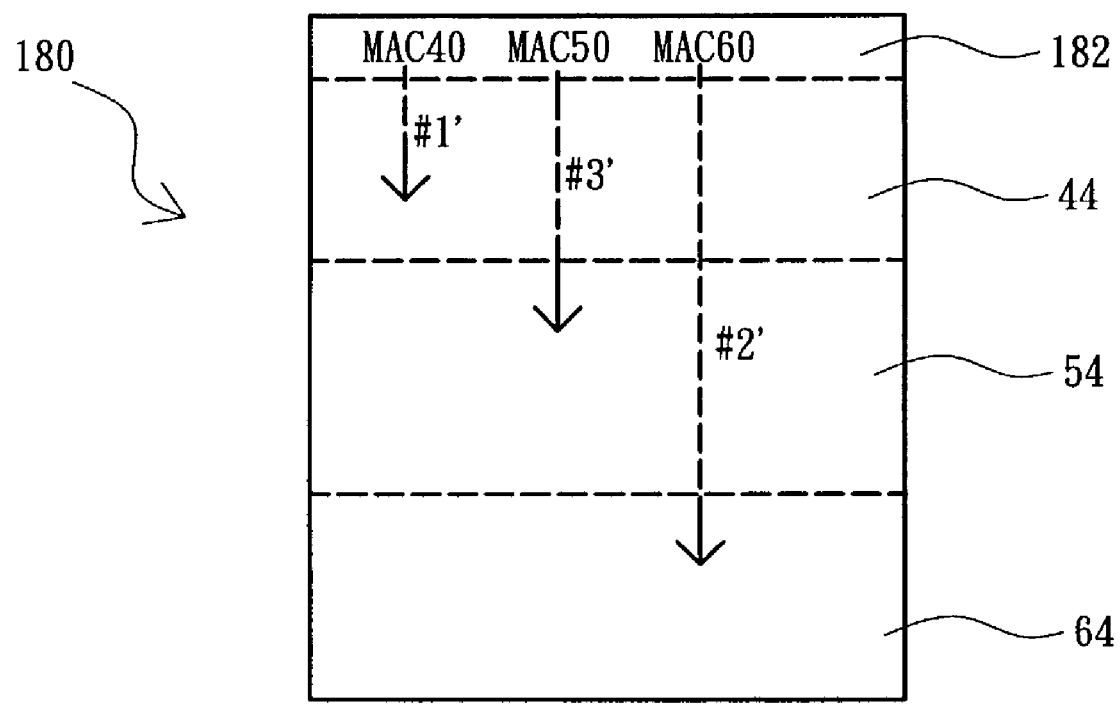
Figure 6:
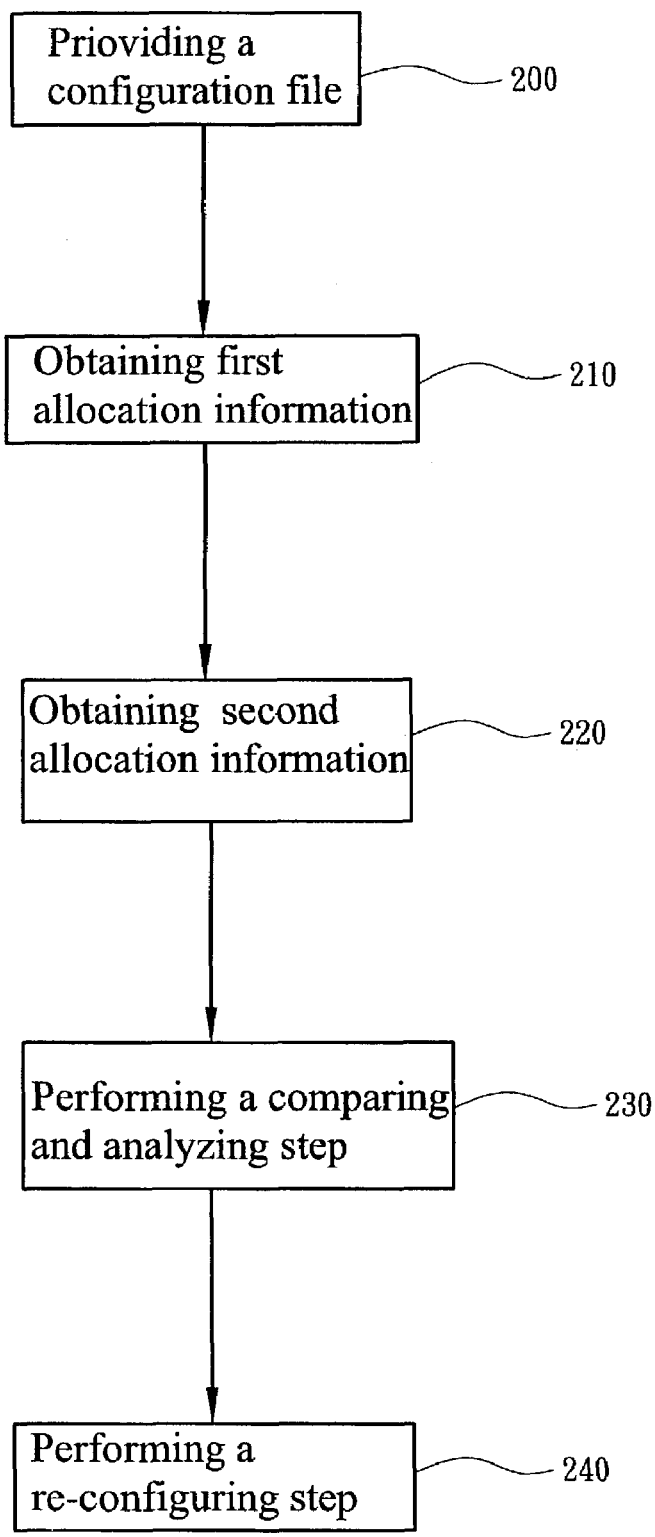

FIG. 5 is a schematic diagram showing the simplified structure of a configuration file, according to the preferred embodiment of the present invention, wherein the initialization data is read in accordance with the current logic stacking sequence of the stackable network devices; and FIG. 6 is a schematic diagram showing a method for auto-configuring stackable network devices according to the preferred embodiment of the present invention.

DETAILED DESCRIPTION OF THE PREFERRED EMBODIMENT

Figure 1:
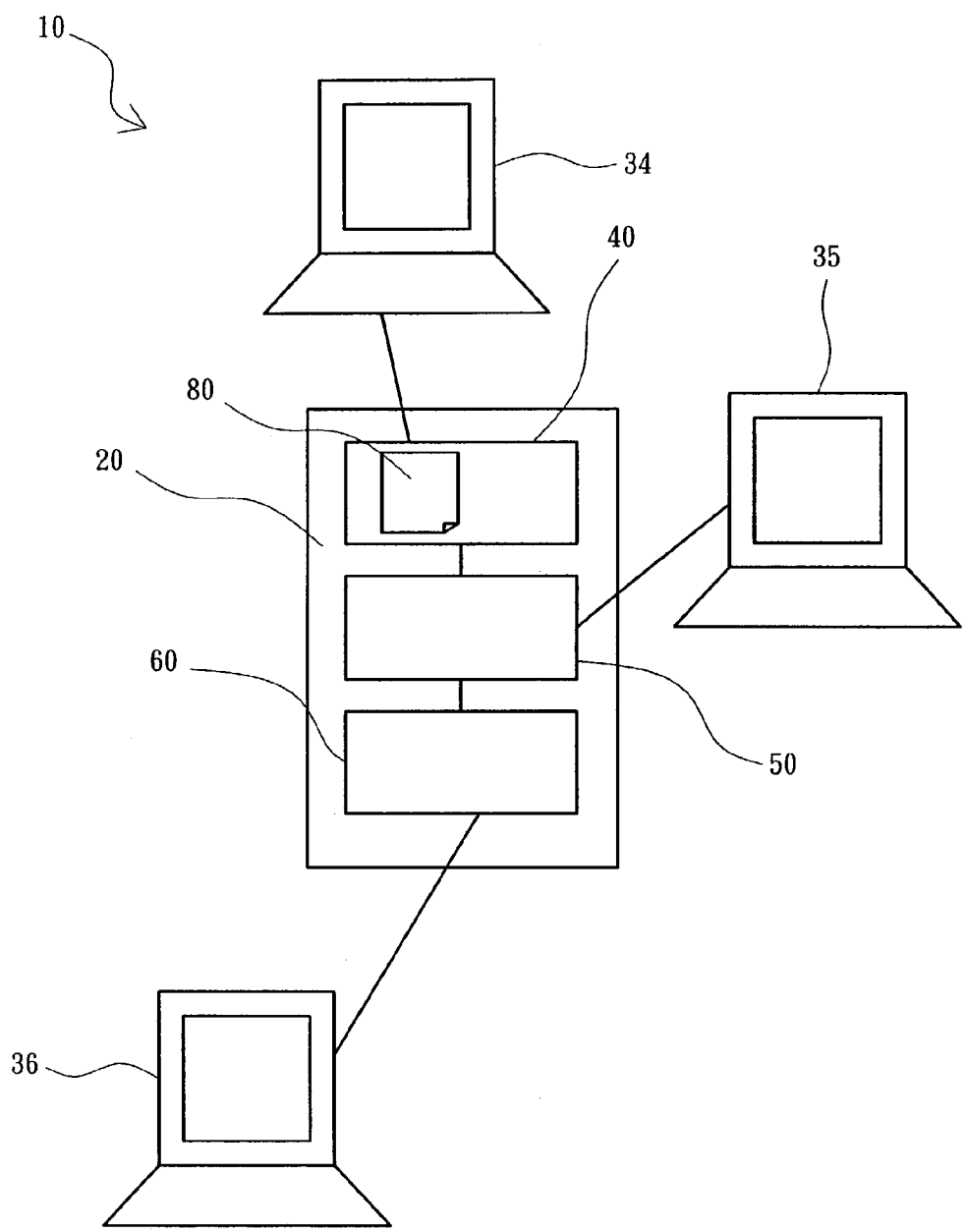
FIG. 1 is schematic diagram showing the simplified structure of a conventional LAN.
Figure 2:
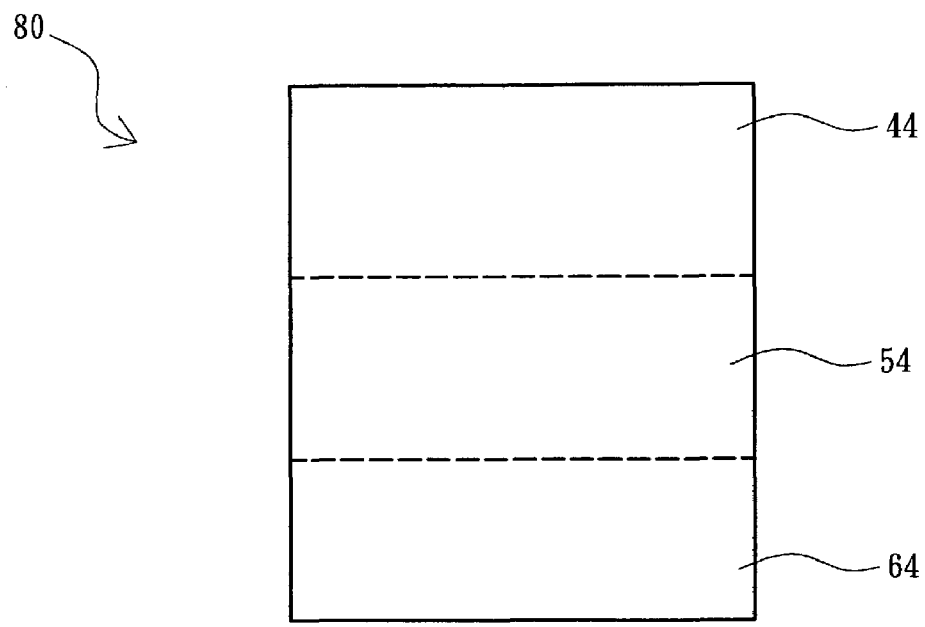
FIG. 2 is a schematic diagram showing the simplified structure of a conventional configuration file.

Please refer to FIG. 1 and FIG. 2, wherein the initialization data 44, the initialization data 54 and the initialization data 64 are arranged in sequence, just as the logic stacking sequence of the stackable network devices 40, 50 and 60, which are also arranged in sequence. Consequently, while in system setup, the initialization data 44, 54 and 64 can be respectively set to the stackable network devices 40, 50 and 60. However, if the logic stacking sequence of the stackable network devices 40, 50 and 60 is changed, for example, the logic sequence number of the stackable network device 50 and the logic sequence number of the stackable network device 60 are swapped, then while in system setup, the initialization data 54 will be set to the stackable network devices 60, and the initialization data 64 will be set to the stackable network devices 50, thus causing system chaos.

Figure 3:
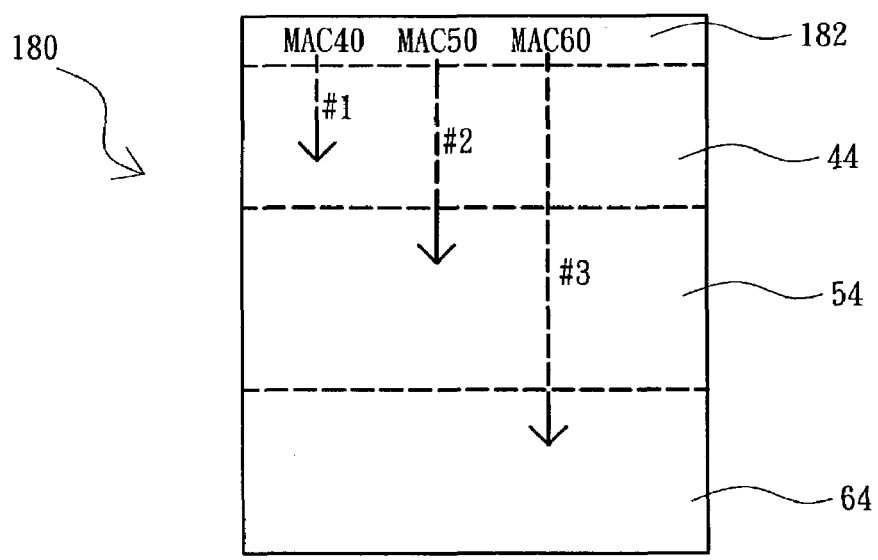
FIG. 3 is a schematic diagram showing the simplified structure of a configuration file, according to a preferred embodiment of the present invention, wherein the initialization data is read in accordance with the logic stacking sequence previously stored for the stackable network devices.

Since each of the stackable network devices has a unique MAC address, thus in the configuration file, the MAC address can be used to distinguish a stackable network device to which initialization data should belong. Please refer to FIG. 1 and FIG. 3. FIG. 3 is a schematic diagram showing the simplified structure of a configuration file, according to a preferred embodiment of the present invention, wherein the initialization data is read in accordance with the logic stacking sequence previously stored for the stackable network devices. The embodiment is mainly featured in adding a MAC address table 182 to a configuration file 180, wherein MAC40 stands for the MAC address of the stackable network device 40; MAC50 stands for the MAC address of the stackable network device 50; and MAC60 stands for the MAC address of the stackable network device 60. MAC40, MAC50 and MAC60 are correspondent to the logic stackable sequence: #1-#2-#3, just as the sequence of the initialization data 44, the initialization data 54 and the initialization data 64 sequentially arranged in the configuration file 180.

Figure 4:
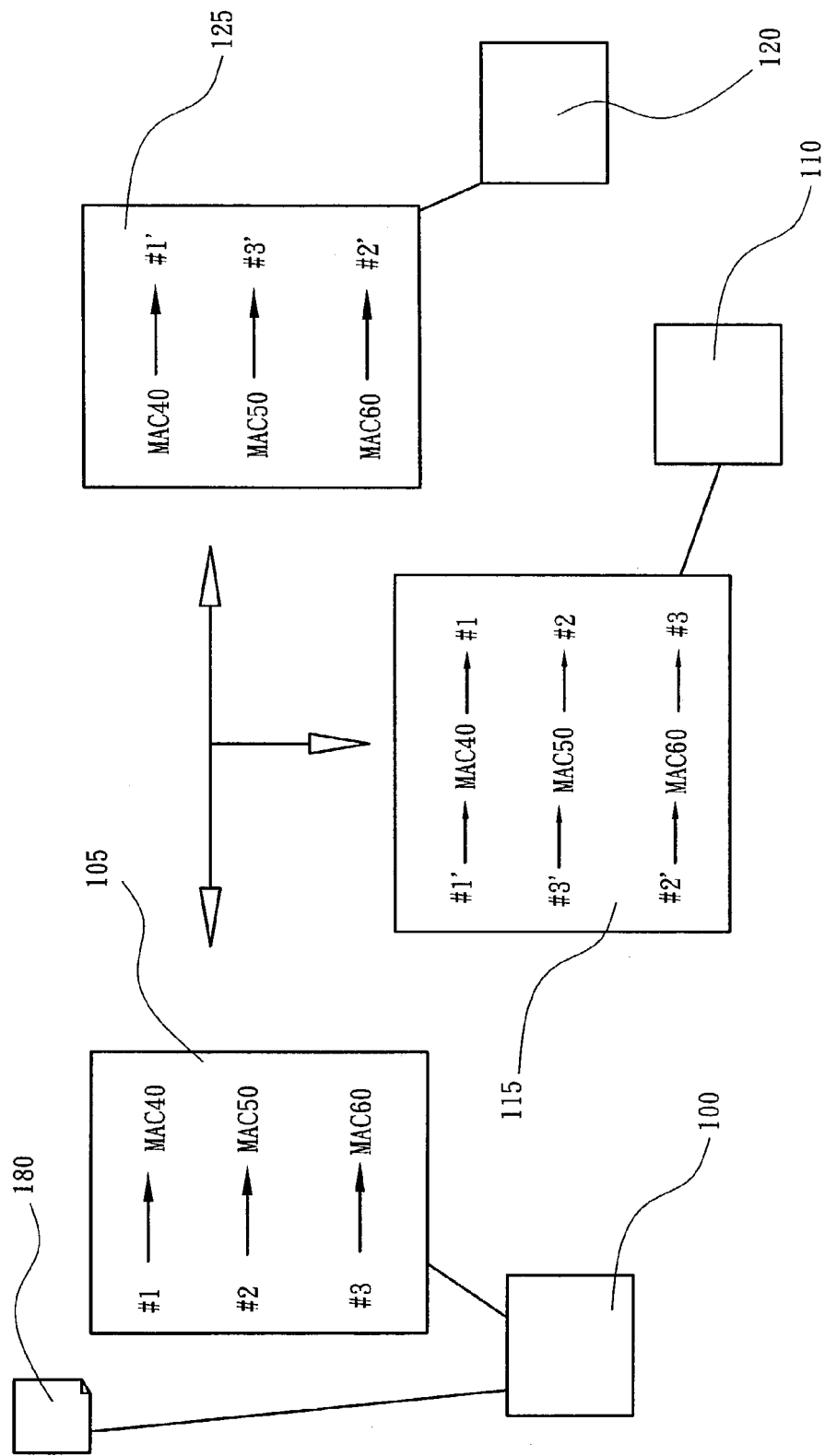
FIG. 4 is a schematic diagram showing a system for auto-configuring stackable network devices according to the preferred embodiment of the present invention.

Please refer to FIG. 1 and FIG. 4. FIG. 4 is a schematic diagram showing a system of the embodiment for auto-configuring stackable network devices. The system for auto-configuring stackable network devices comprises: a configuration file 180, a topology manager 120, a switch controller 110 and a CLI component 100. The configuration file 180 is stored in a master stackable network device (such as the stackable network device 40) of stackable network devices 40, 50 and 60. Since the step of system configuration is performed by the master stackable network device, the configuration file 180 has to be moved or copied to the newly designated master stackable network device if the designation of the master stackable network device is changed. The CLI component 100 reads first allocation information 105 from the configuration file 180, wherein the first allocation information 105 shows the primitive logic staking sequence #1, #2 and #3 respectively corresponding to MAC40, MAC50 and MAC60 of the stackable network devices 40, 50 and 60.

The topology manager 120 is used for obtaining second allocation information 125, wherein the second allocation information 125 shows the current logic staking sequence #1', #3' and #2' respectively corresponding to MAC40, MAC50 and MAC60 of the stackable network devices 40, 50 and 60. The switch controller 110 generates associative allocation information 115 by comparing and analyzing MAC addresses correspondent to the current logic stacking sequence in the second allocation information 125, to the primitive logic stacking sequence correspondent to the MAC addresses in the first allocation information 105.

Referring to FIG. 4 and FIG. 5, FIG. 5 is a schematic diagram showing the simplified structure of a configuration file, according to the preferred embodiment of the present invention, wherein the initialization data is read in accordance with the current logic stacking sequence of the stackable network devices. For example, in the second allocation information 125, the logic sequence number #2' of the current logic stacking sequence corresponds to MAC60; and in the first allocation information 105, MAC60 corresponds to the logic sequence number #3 of the primitive logic stacking sequence, and thus in the associative allocation information 115, it is shown that the logic sequence number #2' of the current logic stacking sequence should be referred to the initialization data 64 originally belonging to the logic sequence number #3 (MAC60) of the primitive logic stacking sequence; and that the logic stacking number #3' of the current logic stacking sequence should be referred to the initialization data 54 originally belonging to the logic sequence number #2 (MAC50) of the primitive logic stacking sequence.

Thereafter, while a step of system initialization or re-stacking is performed onto the stackable network devices, the CLI component 100 will respectively read the initialization data of each of the stackable network devices from the configuration file 180 in accordance with the associative allocation information 115, so as to configure each of the stackable network devices. Further, after the aforementioned step of system configuration is done, the CLI component 100 may execute a command for storing a plurality of current configuration states of the stackable network devices into the configuration file 180, so that the first allocation information 105 is identical to the second allocation information 124 at this point.

Referring to FIG. 6, FIG. 6 is a schematic diagram showing a method for auto-configuring stackable network devices according to the preferred embodiment of the present invention. To sum up, the method of the present invention for auto-configuring stackable network devices is explained as follows:

At first, a configuration file is provided (step 200), and just as described above, the configuration file is stored in a master stackable network device, and the initialization data previously stored for stackable network devices is recorded in the configuration file, wherein the configuration file has a MAC address table used for indicating the correlation between MAC addresses of the stackable network devices and the locations at which the initialization data of the stackable network devices are recorded, and the MAC address table is fabricated in accordance with first allocation information, and the MAC addresses are arranged in accordance with the first allocation information. Thereafter, a CLI component is used to perform a step 210 for obtaining first allocation information, wherein the first allocation information, the MAC address is correspondent to a first logic stacking sequence. Then, a topology manager is used to perform a step 220 for obtaining second allocation information regarding the current arrangement of the MAC addresses for the stackable network devices, wherein the second allocation information, the MAC addresses correspond to a second logic stacking sequence. Therefore, a switch controller is used to perform a comparing and analyzing step 230 for generating associative allocation information by comparing and analyzing the MAC addresses correspondent to the second logic stacking sequence in the second allocation information, and the first logic stacking sequence correspondent to the MAC addresses in the first allocation information. Then, the CLI component is used to perform a re-configuration step 240 for configuring the stackable network devices by respectively reading the initialization data of the stackable network devices in the configuration file according to the associative allocation information, wherein the re-configuration step 240 can also be the step of system configuration, which is performed when the system is activated.

It is noted that the present invention is suitable for use in any kind of stackable network device having a MAC address and a CLI component, such as a stackable switch, a stackable hub, a stackable switching hub or a stackable switching router, etc.

From the preferred embodiment of the present invention, it is known that the advantage of applying the present invention is that: when the logic stacking sequence of stackable network devices is altered, users can automatically configure the stackable network devices simply via the step of system initialization or re-stacking, so that the convenience of using the stackable network devices is enhanced and a lot of manpower and material are saved, thus further greatly reducing the down time of network.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structures.

What is claimed is:

1. A system for auto-configuring stackable network devices, said system comprising:

a plurality of stackable network devices which are stacked and connected, said stackable network devices having a plurality of medium access control (MAC) addresses and a plurality of sets of initialization data, respectively;

a configuration file in which said sets of initialization data are previously stored for initializing said stackable network devices, said configuration file having a MAC address table listing said MAC addresses for pointing out the correlations between said MAC addresses and the locations at which said sets of initialization data are recorded, said MAC addresses being correspondent to a primitive logic stacking sequence shown in first allocation information;

a topology manager for obtaining second allocation information showing a current logic stacking sequence, wherein said MAC addresses are currently correspondent to said current logic stacking sequence;

a switch controller for generating associative allocation information by comparing and analyzing said MAC addresses correspondent to said current logic stacking sequence in said second allocation information to said MAC addresses correspondent to said primitive logic stacking sequence in said first allocation information; and a command line interface (CLI) component for configuring said stackable network devices arranged in said current logic sequence respectively by reading said sets of initialization data of said stackable network devices from said configuration file in accordance with said associative allocation information.

2. The system for auto-configuring stackable network devices of claim 1, wherein said stackable network devices are selected from a group consisting of a stackable switch, a stackable hub, a stackable switching hub and a stackable switching router.

3. The system for auto-configuring stackable network devices of claim 1, wherein said CLI component executes a command for storing a plurality of current configuration states of said stackable network devices into said configuration file.

4. The system for auto-configuring stackable network devices of claim 1, wherein said configuration file is stored in a master stackable network device of said stackable network devices, and said master stackable network device is used for performing a step of system configuration.

5. A method for auto-configuring stackable network devices, said method comprising:

providing a plurality of stackable network devices which are stacked and connected, said stackable network devices having a plurality of medium access control (MAC) addresses and a plurality of sets of initialization data respectively;

providing a configuration file in which said sets of initialization data are previously stored for initializing said stackable network devices, said configuration file having a MAC address table listing said MAC addresses for pointing out the correlations between said MAC addresses and the locations at which said sets of initialization data are recorded;

obtaining first allocation information showing a primitive logic stacking sequence, said MAC addresses being correspondent to said primitive logic stacking sequence;

obtaining second allocation information showing a current logic stacking sequence, wherein said MAC addresses are currently arranged and correspondent to said current logic stacking sequence;

generating associative allocation information by comparing and analyzing said MAC addresses correspondent to said current logic stacking sequence in said second allocation information to said MAC addresses correspondent to said primitive logic stacking sequence in said first allocation information; and configuring said stackable network devices arranged in said current logic sequence respectively by reading said sets of initialization data of said stackable network devices from said configuration file in accordance with said associative allocation information.

6. The method for auto-configuring stackable network devices of claim 5, wherein said stackable network devices are selected from a group consisting of a stackable switch, a stackable hub, a stackable switching hub and a stackable switching router.

7. The method for auto-configuring stackable network devices of claim 5, wherein said CLI component executes a command for storing a plurality of current configuration states of said stackable network devices into said configuration file.

8. The method for auto-configuring stackable network devices of claim 5, wherein said step of obtaining said second allocation information is performed by a topology manager.

9. The method for auto-configuring stackable network devices of claim 5, wherein said step for generating said associative allocation information is performed by a switch controller.

10. The method for auto-configuring stackable network devices of claim 7, wherein said re-configuration step is performed by said CLI component.

11. The method for auto-configuring stackable network devices of claim 7, wherein said step of obtaining said first allocation information is performed by said CLI component.

12. The method for auto-configuring stackable network devices of claim 5, wherein said configuration file is stored in a master stackable network device of said stackable network devices, and said master stackable network device is used for performing a step of system configuration.

* * * * *